United States Patent [19]

Schieber et al.

[11] 4,383,321

[45] May 10, 1983

[54] CARBON ELECTRODE, IN PARTICULAR A GRAPHITE ELECTRODE FOR PRODUCING STEEL

[75] Inventors: Franz Schieber, Röthenbach; Dieter Mayer, Schwabach, both of Fed. Rep. of Germany

[73] Assignee: C. Conradty Nurnberg GmbH & Co KG, Pegnitz, Fed. Rep. of Germany

[21] Appl. No.: 221,028

[22] Filed: Dec. 29, 1980

[30] Foreign Application Priority Data

Jul. 25, 1980 [DE] Fed. Rep. of Germany ....... 3028348

[51] Int. Cl.$^3$ ............................................. H05B 7/085
[52] U.S. Cl. .................................................... 373/88
[58] Field of Search ................... 13/18 R, 18 B, 18 C; 219/145.1; 428/408

[56] References Cited

U.S. PATENT DOCUMENTS

| 1,223,986 | 4/1917 | King | 13/18 R X |
| 1,312,256 | 8/1919 | King | 13/18 R X |
| 1,312,257 | 8/1919 | King | 13/18 R X |
| 2,040,215 | 5/1936 | Rava | 13/18 R |
| 3,867,667 | 2/1975 | Suga | 13/18 R |

Primary Examiner—Roy N. Envall, Jr.
Attorney, Agent, or Firm—Gifford, Van Ophem, Sheridan and Sprinkle

[57] ABSTRACT

A carbon electrode, in particular a graphite electrode for producing steel which can be used for electric arc melting furnaces of conventional design. The electrode comprises a metal-containing protective layer, and fusion of the contact jaws of the electrode holder with the metal-containing protective layer is avoided by covering at least part of the electrode surface by a graphite-containing material.

11 Claims, 2 Drawing Figures

CARBON ELECTRODE, IN PARTICULAR A GRAPHITE ELECTRODE FOR PRODUCING STEEL

BACKGROUND OF THE INVENTION

I. Field of the Invention

The invention relates to a carbon electrode, in particular a graphite electrode for producing steel, comprising a metal-containing coating to increase the electrical conductivity and/or to decrease the oxidation loss on the lateral electrode surface.

Metal-containing protective coatings have been developed in order to reduce surface oxidation of graphite electrodes and, hence, to reduce the consumption of the surface of the electrode. These protective coatings consist for example of carbides, silicides, oxides, metals or combinations of such materials and are applied onto the electrode surface by spraying and by subsequently being burned-in by means of an electric arc, whereby they are securely connected to the electrode surface.

A coating consisting of aluminum and silicon carbide has proven to be particularly useful for this purpose. After the coating has been applied, the graphite electrode has a metallic, rough coat, the conductivity of which nearly corresponds to that of the aluminum, and which securely adheres to the graphite surface because of the preceeding electric arc treatment. Starting at about 500° C., the protective coating becomes slightly plastic, so that it then becomes impermeable to gas. With increasing temperature, it is gradually converted to oxide beneath the electrode holder, but it retains its protective function.

The advantage attained by such coated graphite electrodes, namely the reduction consumption and erosion of the surface of the electrode is opposed by a considerable drawback resulting from the fact that the working material of the electrode holder must be matched to the requirements of the metallic coating surface introduction of the electrode through the furnace cover must be such that the coating is not scraped off. Therefore, in order to avoid fusion of the contact jaws (customarily consisting of copper) with the metallic coating of the graphite electrodes, the copper contacts must be replaced by appropriate contacts, such as those made of graphite. Furthermore, it has been necessary to employ a well effective sealing ring for each electode, so that more extensive contaminations of the coating and of the contacts are avoided.

These types of re-constructions of furnaces needed when changing over to coated electrodes have a considerable cost.

Now even though it has become known from German OS No. 22 51 590 to spray graphite a as heat-resistant material onto an electrode surface coated with aluminum in a process for producing protective coatings on objects made of carbon, this measure nevertheless only serves to increase the melting point of the coating. After the graphite has been applied, this higher-melting coating is formed by fusion of the graphite to the aluminum using an electric arc.

A similar use of graphite is known in connection with a process for producing aluminium-containing protective coatings on carbon products (German AS No. 1 646 679), wherein a spread of graphite is applied onto the aluminum previously sprayed onto the carbon article. This graphitic spread is then directly exposed to processing in the electric-arc furnace, whereupon the surface of the thus produced coating is formed.

SUMMARY OF THE PRESENT INVENTION

Therefore, it is an object of the present invention to provide a carbon electrode, in particular a graphite electrode of the mentioned type such that it is possible to use such electrodes for electric arc melting furnaces of conventional design, without needing to structurally alter the furnaces in the above-described manner.

In order to accomplish this object, that is, in order to avoid melting together of the contact jaws with the metallic protective layer, the invention provides for at least partly covering the surface of the metalically coated electrode with a graphite-containing material, which according to an advantageous embodiment of the invention may consist of a mixture of 700 parts of graphite powder having a grain less than 1000 $\mu$m, 100 to 400 parts of a curable synthetic resin, 20 to 80 parts of a water-soluble adhesive and water. A phenol-novolak hexamethylene tetramine resin has proved particularly serviceable as the synthetic resin, and a polyvinyl alcohol is particularly suited as the adhesive.

The preferred average thickness of the layer of graphite-containing material is from 0.1 to 2.0 mm, whereby it is ensured that dust particles that deposit on the surface of the jaws are embedded into the graphite-containing material when the jaws are hydraulically urged against the electrode surface and thus do not adversely affect the electrical contact.

The graphite-containing material covering the metal-containing surface may form a layer which securely adheres to the metal-containing surface, for example, which is sprayed or brushed on. There also is the possibility, however, of realizing the advantages obtained from using a graphite-containing material in the region of the contact jaws with a material layer that does not completely securely adhere to the metal-containing surface or that even only loosely rests on it, for example in the form of a film.

The use of the graphite-containing material layer on the metallic electrode surface not only has the advantage of whole or at least partly avoiding furnace reconstructions which otherwise would be required, but has the further advantage of allowing the use of contact jaws of copper, such as is conventional with uncoated graphite electrodes.

Previously known measures are neither intended for, nor do they make obvious, elimination of the drawback of required furnace reconstruction when using graphite electrodes provided with only customary metallic protective coatings.

BRIEF DESCRIPTION OF THE DRAWINGS

A better understanding of the present invention will be had upon reference to the following detailed description, when read in conjunction with the accompanying drawing, wherein like reference characters refer to like parts, and in which.

DETAILED DESCRIPTION OF THE PREFERRED EMBODIMENT OF THE PRESENT INVENTION

Figure 1:
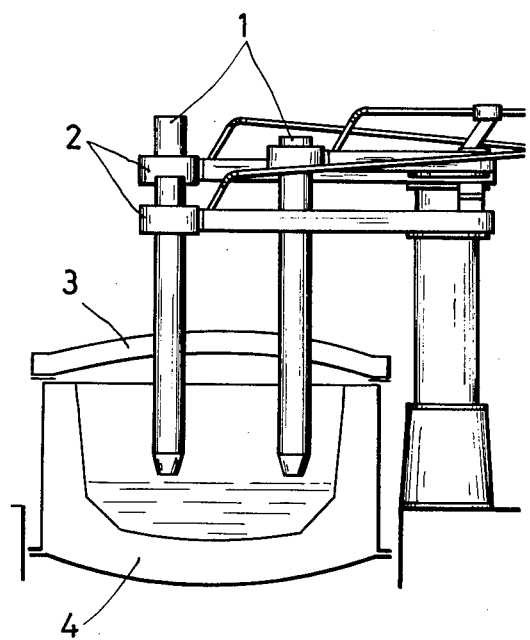
FIG. 1 is a schematic side view of the preferred embodiment of the present invention.

With reference now to FIG. 1, the present invention is thereshown and comprises the electrodes 1, which are held by contact jaws 2 that are hydraulically urged against the electrode surface, and which extend in a known manner through the cover 3 of the electric-arc furnace 4. The protective coating of the electrodes in such a furnace is exposed to very severe operating conditions because when oxygen is blown in, slag splatters up to the furnace cover and covers the electrode surface. Despite a good sealing of the electrodes as they pass through the cover with the aid of known sealing devices, a certain contamination of the electrode surface in the region of the contact jaws 2 can frequently not be entirely prevented. Due to the fact that the graphite-containing material described below is applied onto the metal-containing protective coating in a layer thickness of about 0.1 to 2.0 mm and is somewhat ductile, the hydraulic contact jaws, which consist of copper, can urge the dirt particles in the region of their contact surfaces into the graphite-containing material, with disadvantageous effects on the transfer resistance between jaw and electrode thus being avoided. There is no welding between jaws and graphite-containing material, so that the jaws may consist of copper, and the release of the contact jaws from the electrode surface for the purpose of resetting the electrode is unrestricted.

Figure 2:
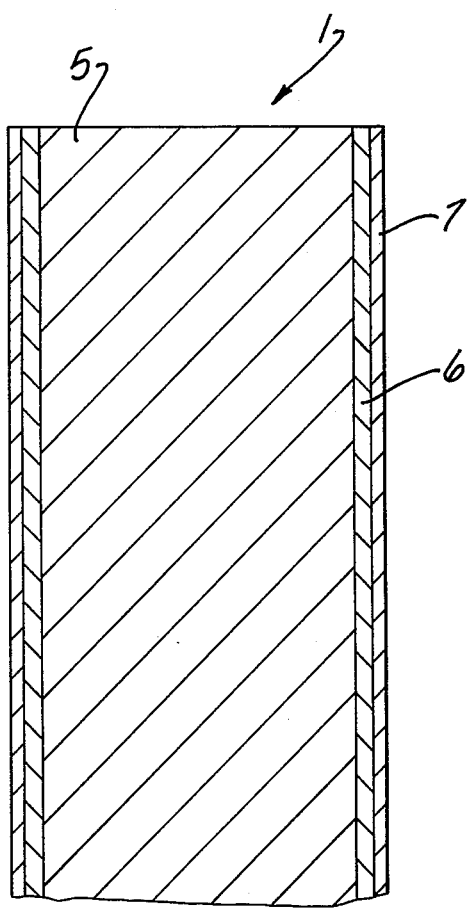
FIG. 2 is a side cross-sectional view of the preferred embodiment of the present invention.

As shown in FIG. 2, the electrode 1 according to the present invention is provided with a core 5 of carbon or graphite, covered by a first metal-containing coating 6 and a second protective coating 7 of graphite-containing material disposed on the first coating 6. The second coating 7 covers at least the area on the electrode connectable to the jaws 2 of an electrode holder. Thus fusion of the jaws 2 to the electrode 1 is prevented.

ILLUSTRATIVE EMBODIMENT

The preferred graphite-containing material comprises a mixture of about 700 parts by weight of Ceylon graphite powder, having a particle size of less than 63 $\mu$m; 150 parts by weight of finely ground phenyl-novolak hexamethylene tetramine resin; 30 parts by weight of commercial polyvinyl alcohol; and water in a quantity sufficient to suspend or dissolve these mixed powders to obtain a paste that is capable of being spread or sprayed.

This suspension is spread several times onto a graphite electrode provided with an aluminum coating and having a diameter of 355 mm and a length 2000 mm, wherein air drying takes place between each spreading operation, and with an average coating thickness of the graphite-containing material of 0.1 to 1.0 mm ultimately resulting.

The entire air-dried graphite-containing layer of material is then briefly heated to from 150° to 180° C. in order to condense the resin.

The above example of producing the electrode according to the invention can be extensively modified, in particular as regards the composition of the graphite-containing material, but also with regard to the application of the material. Such application may take place, instead of by spreading or brushing-on, also by being sprayed onto the graphite electrode which has been provided with a metal-containing covering.

The composition of the graphite-containing material may be modified in the following ways: use of a graphite powder, not necessarily Ceylon graphite, having a particle size of less than about 1000 $\mu$m; use of about 100 to 400 parts of a curable synthetic resin, not necessarily a finely ground phenol-novolak hexamethylene tetramine resin; and use of about 20 to 80 parts of a water-soluble adhesive, not necessarily polyvinyl alcohol.

The finished electrode can be directly inserted into the conventional jaws 2 of an electric arc melting furnace for producing steel, such as shown in FIG. 1. The use of this electrode does not result in any welding whatsoever between its surface and the jaws, which may for example consist of copper.

Because the graphite-containing material may be spread, brushed, or sprayed onto the electrode surface, the material is securely anchored to the irregularities of the metal coating.

However, it also is conceivable to cover the metal-containing electrode surface with the graphite-containing material in a manner in which no continuous mechanical solid connection or, permanent connection is established between the material and the surface. Hence, only a temporary connection is established, for example with the aid of a film of graphite-containing material, which film is wound around the electrode.

Thus, the electrode according to the present invention provides a way in which metallically coated graphite electrodes may be employed in electric arc furnaces without the costly oxidation and erosion conventionally experienced, by providing a second graphite-containing coating upon at least a part of the electrode. Having described our invention, however, many modifications thereto will become apparent to those skilled in the art to which it pertains without deviation from the spirit of the invention as defined by the claims.

We claim:

1. In a carbon electrode for an electric furnace, said electrode having a first coating comprising a metal containing composition, and said electrode having upon its surface an area connectable to the jaws of an electrode holder, the improvement therein comprising a second coating upon said first coating, said second coating comprising a graphite containing material, and said second coating covering at least said area on said electrode, whereby fusion of said jaws of said electrode holder to said electrode is prevented.

2. The electrode according to claim 1 wherein said second coating is sufficiently ductile so as to accept intrusion of splatter from said furnace into said second coating without said fusion of said jaws and said electrode.

3. The invention according to claim 1 wherein said second coating comprises a mixture containing about 700 parts of graphite powder, said powder having a grain size of less than 1,000 micrometers; 100-400 parts of a curable synthetic resin; 20-80 parts of a water-soluble adhesive; and a quantity of water sufficient to permit application of said mixture to said electrode.

4. The invention according to claim 3 wherein said synthetic resin is a phenol-novolak hexamethylene tetramine resin.

5. The invention according to claim 3 wherein said water-soluble adhesive is commercial polyvinyl alcohol.

6. The invention according to claim 1 wherein the average layer thickness of said second coating is about 0.1 to 2.0 milimeters.

7. The invention according to claim 1 wherein said first coating consists predominantly of aluminum.

8. The invention according to claim 1 wherein said second coating forms a mechanical, solid connection to said electrode.

9. The invention according to claim 1 wherein said second coating rests loosly on said first coating and without a continuous, mechanical solid connection to said first coating.

10. The invention according to claim 1 wherein said electrode comprises a graphite electrode for producing steel.

11. The invention according to claim 1 wherein said coating is formed from a film of graphite-containing material, said film being wound around said electrode.

* * * * *